(No Model.) 2 Sheets—Sheet 1.
N. LYKE.
ELECTRICAL SPRAY AND VAPOR BATH.
No. 421,294. Patented Feb. 11, 1890.
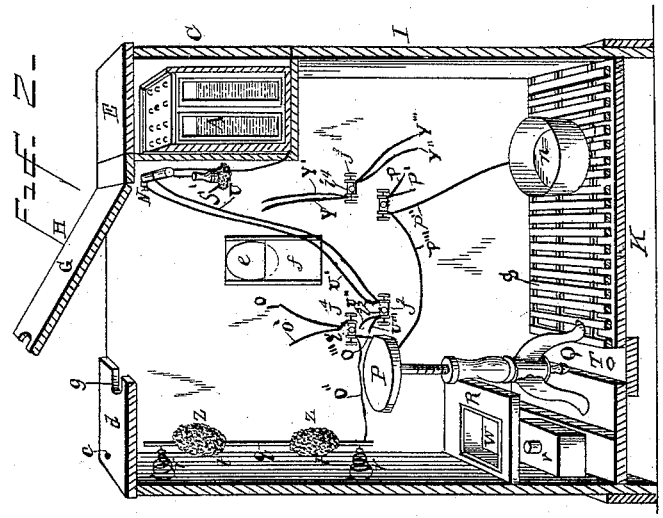
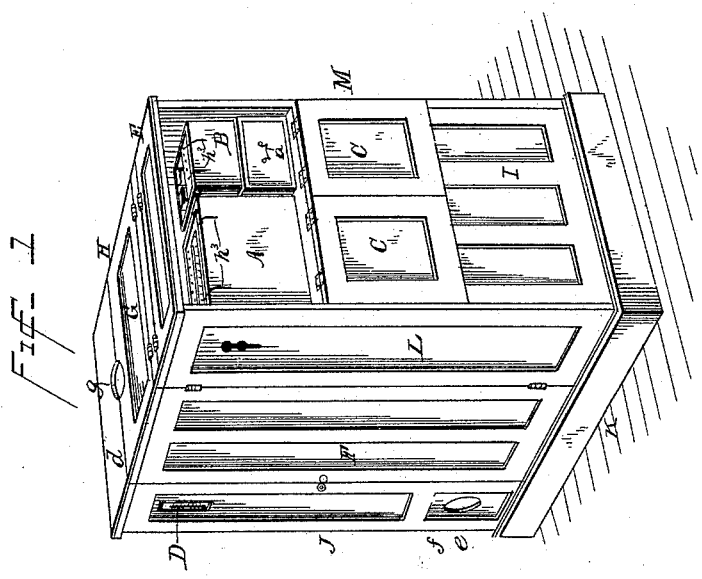
Witnesses
Norris A. Clark.
Arthur A. Ent.
Inventor
Nathaniel Lyke
By his Attorney
Frank L. Dyer (No Model.) 2 Sheets—Sheet 2.
N. LYKE.
ELECTRICAL SPRAY AND VAPOR BATH.
No. 421,294. Patented Feb. 11, 1890.
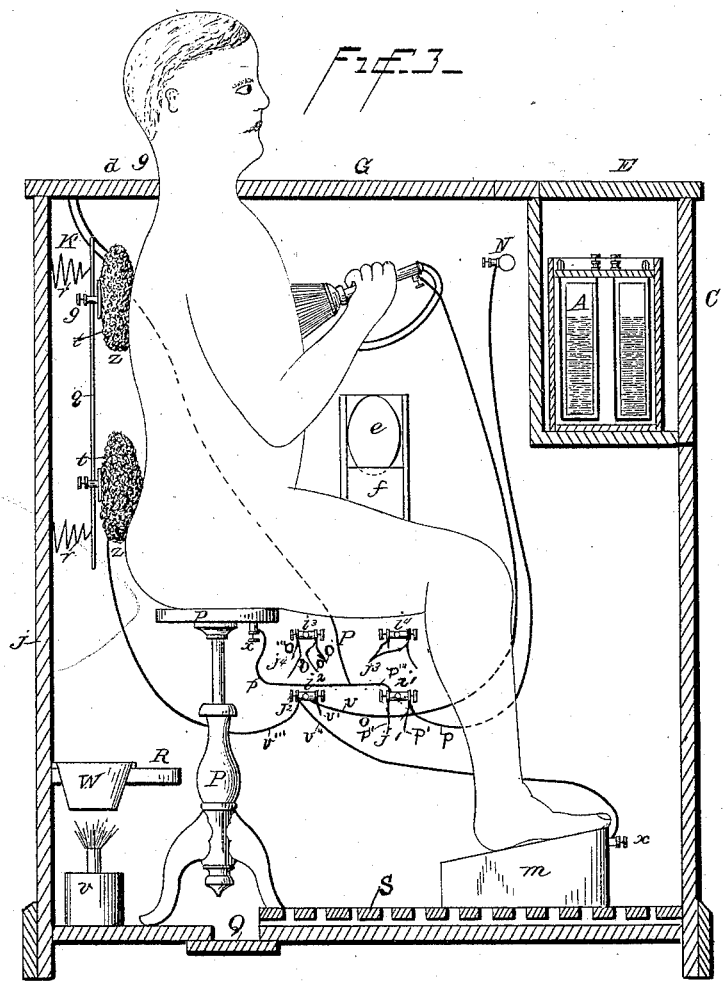
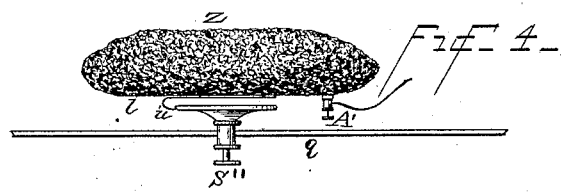
Witnesses
Norris A. Clark.
Arthur A. Erb
Inventor
Nathaniel Lyke
By his Attorney
Frank L. Dyer

UNITED STATES PATENT OFFICE.

NATHANIEL LYKE, OF WILLIAMSPORT, PENNSYLVANIA.

ELECTRICAL SPRAY AND VAPOR BATH.

SPECIFICATION forming part of Letters Patent No. 421,294, dated February 11, 1890.

Application filed February 4, 1889. Serial No. 298,658. (No model.)

*To all whom it may concern:*

Be it known that I, NATHANIEL LYKE, a citizen of the United States, residing at Williamsport, in the county of Lycoming and State of Pennsylvania, have invented certain new and useful Improvements in Electric Spray and Vapor Baths, of which the following is a full, clear, and exact description.

The principal object of my invention is to provide a simple bath in which electric currents may be applied to the human system in the most efficient manner and in the greatest possible variety of ways, while at the same time the bath may be used independently for giving Russian and Turkish baths without the use of the electric current, and to this end I have designed the apparatus hereinafter to be described and claimed.

In the drawings, Figure 1 is a perspective view of my improved bath, showing the battery-receptacle open. Fig. 2 is a longitudinal sectional view of the same. Fig. 3 is a similar section, enlarged, representing the patient in the bath; and Fig. 4 is a detailed view of one sponge-electrode.

Like reference-letters refer to like parts throughout.

The casing for the bath is preferably made rectangular in shape, having the ends I J, the sides L M, the top H, and the bottom K.

Within the bath, upon the bottom thereof, is placed a rack S, and the water which drops through said rack and accumulates upon the bottom K flows into the trough Q and out through the hole T into any suitable receptacle which may be placed beneath it. A chamber for the reception of the batteries is placed at one side of the casing near the top, as shown in Figs. 1 and 2. In this chamber are placed the batteries A and B, and the same are put out of sight and protected from dirt by closing the covers E C C. These batteries may be of any desired construction; but I preferably employ one battery which shall give a low-tension continuous current or voltaic current and another with suitable apparatus for producing a high-tension current of the alternating or make-and-break character, of the class properly known as "faradic currents." The poles of these batteries are connected, (by separate sets of conductors embedded in the walls of the bath, and not shown,) the voltaic battery to the lower set of binding-posts, which have the screw-caps $i^2 j^2 i' j'$, as shown in Fig. 3, and the poles of the faradic battery to the upper set of binding-posts—viz., those having the screw-caps $i^3 j^4 i^4 j^3$.

On one side of the casing of the bath is formed the door F, opening outward. Upon the top of the casing is formed the door G, which opens upward, and in this door G and in the corresponding fixed portion $d$ of the top is cut a circular hole $g$, which shall permit the head of the patient to be without the bath while his body is inclosed within the same, his neck filling the said opening $g$.

Within the bath is placed a powerful spirit-lamp $v$, and over this may be supported a water basin or trough W in the rack R. The object of these parts is that by lighting the spirit-lamp and filling the trough W with water a large quantity of steam may be generated for use either alone or in conjunction with the electrical currents generated by the apparatus elsewhere described. By removing the trough W and still permitting the lamp $v$ to burn the air will be heated, and a dry hot bath or Turkish bath may then be gotten.

A peculiar form of spring-sponge-electrode, for use upon the body of the patient is illustrated in Figs. 2, 3, and 4 of the drawings. The sponge-electrode Z consists of the sponge $t$, mounted on a metallic backing-plate $l$, which has a binding-screw A', in which an electric conductor may be held in the usual way. The backing-plate $l$ is mounted on a spring $u$, which is adjustably mounted upon the rod $q$ by means of the thumb-screw S''. The rod $q$ is in turn mounted on suitable springs $r$ $r$, by which arrangement a duplex spring action is obtained, which insures the perfect fitting of the electrodes to the body of the patient whether the same are at the back or side. In cases where the electrical connection is made to the binding-post A' the thumb-screw and standard S'' should be made of insulated material. In cases where the electrical connection is made direct to the rod $q$, as shown in Fig. 2, the springs $r$ should be mounted upon insulating material.

The water for the spraying-electrode is introduced, as shown in Fig. 3, through a rubber pipe or hose K', entering through the hole $c$ in the top of the bath, as shown in Fig. 2, and discharged through the spray-nozzle. The spray-nozzle is formed of metal, and has a binding-post to which electrical connection may be made. The said nozzle is insulated from the hand of the patient by a covering of rubber or any other suitable insulating substance. The sponge-electrode S', for use by the hand, is similarly constructed of metal and provided with an insulating-envelope. Suitable openings $e$, closed by slides $f$, are made at different points in the casing for inserting the lamp $v$ and handing to the patient any object which he may desire without necessitating the opening of the cover G of the bath.

When in the bath, the patient takes his seat upon the adjustable stool P and places his feet upon the metallic foot-rest $m$, as shown in Fig. 3, or in the pan of water, as shown in Fig. 2, the stool and the foot-rest or pan being provided with the usual binding-posts for the proper electrical connections.

The thermometer D (shown in Fig. 1) is set in the casing of the bath, so that its bulb is exposed to the temperature of the atmosphere within the said bath, while the scale may be read from the outside, thereby readily and accurately indicating the varying temperatures within the bath.

The adjustable electric connections, which form a feature of my invention, are made by means of wire or other flexible conductors extending from the double binding-posts to the body-sponges, the stool, the foot-rest, the spray-nozzle, the movable sponge-electrode S', and the hand-rest or cross-bar N, or to any number of these electrodes, at the will of the operator. The cross-bar N may be of metal insulated at the points of its bearings in the frame or box of the bath; or it may be of wood with a metallic covering in the shape of a cylinder, of metal nickel-plated, or in any other convenient form, said metallic covering extending over the central portion of the bar. Then when connection is made from the binding-post to this metallic portion of the bar the current will pass through the arm of the patient when his hand rests on the bar and the circuit is completed by some other electrode touching another portion of his body. The two upper binding-posts are connected with the poles of the faradic battery by suitable conductors embedded in the casing of the bath, which do not appear in the drawings. Thus the binding-post which has the screw-caps $i^3 j^4$ may be connected with the positive pole and the binding-post which has the screw-caps $i^4 j^3$ may be connected with the negative pole of this battery. In the same way the binding-post which has the screw-caps $i^2 j^2$ and the binding-post which has the screw-caps $i' j'$ are connected with the poles of the galvanic battery. From these binding-posts any number of flexible conductors may lead to the various electrodes; but I find that the most convenient arrangement is to have a bifurcated conducting wire or cable with its two branches leading from each of the eight screw-caps of the four double binding-posts, $p\ p'\ p''\ p'''$ from $i'\ j'\ u\ u'\ u''\ u'''$ from $j^2$ and $i^2$, $y\ y'$ from $i^4$, $y''\ y'''$ from $j^3$, $o\ o'$ and $o''\ o'''$ from $i^3 j^4$. Thus I have sixteen points of distribution of current, any or all of which may be used in a large number of combinations, so as to concentrate or diffuse the currents over the whole or portions of the body of the patient in an almost infinite variety of ways. Thus in Fig. 2 portions of the faradic current are shunted through the back sponge and the stool and unite to return to the battery, say, by way of the spray-electrode, (shown in Fig. 3, but not in Fig. 2,) while the galvanic battery is shunted at both poles and passes out from the hand-rest and movable sponge-electrode to return by the stool and foot-rest. In Fig. 3 the faradic battery is left on open circuit, while the galvanic current is shunted through back sponge, foot-rest, and spray to return through stool and hand-rest.

Without further description it will be evident that by suitable arrangements of the conductors the galvanic and faradic currents may be passed through the entire body of the patient in the same or in opposite directions; they may both be localized in order to reach certain affected members, or one may be general and the other local in its application, &c. The convenience of this adjustability of connections is obvious. They may be made by the patient while he is in the bath. There is also another point of advantage in my use of the movable spray and sponge electrode in combination with a plurality of contact-points, which will be understood when it is considered that the extreme variations of currents possible may be applied to different portions of the body of the patient while said patient is in the bath, and without any changes in the electrical connections. Thus, suppose it should be desired to apply a powerful faradic current to each part of the patient's body in turn, the said current being so strong that a lengthy application at any one part would be injurious and unendurable. In this case the current from one binding-post would be shunted to, say, four points, the body-sponges, the stool, the foot-rest, and the hand-rest. The circuit back to the battery would be completed through the movable spray-electrode or through the movable sponge-electrode S', which would be connected with the second binding-post. Then as the spray is turned upon different portions of the body of the patient the current will be short-circuited through the arm, the chest, the lower portion of the trunk, or the legs. Currents of all variations of strength may thus be applied to any part of the body at one sitting and without changing a connection or bothering with a switch-board.

Of course by connecting an upper and lower binding-post together the faradic and galvanic currents may be made to coincide either wholly or in part in their paths.

While I have shown but two sponge-electrodes for the back, more might be used, and some of these additional electrodes might press against the side of the patient without departing from the spirit of my invention.

Having therefore described my invention, what I claim as new, and desire to protect by Letters Patent, is—

1. In an electric bath, the within-described sponge-electrode, consisting of one or more pads Z, mounted on a leaf-spring $u$ and movably attached to a bar $q$, mounted on springs $r$, substantially as set forth.

2. In an electric vapor-bath, the combination of a number of stationary electrodes within the casing, by which contact may be made with the body of the patient at different points, adjustable electric connections by which any number of said electrodes may be connected to one pole of an electric battery, and a movable spray-electrode which may be connected with the other pole of the battery, together with said battery, substantially as described.

3. In an electric vapor-bath, the combination of stationary electrodes within the casing, by which contact may be made with the body of the patient at different points, adjustable electric connections by which any number of said electrodes may be connected to one pole of an electric battery, and a movable spray-electrode which may be connected to the other pole of the battery, together with said electric battery, a second battery producing a current of different character from the first, and adjustable electric connections by which any number of the above-mentioned electrodes may also be placed in circuit with the poles of said second battery, substantially as described.

4. In an electric vapor-bath, the combination of two batteries furnishing currents of different character, binding-posts within the bath-casing connected with the poles of the battery, a number of stationary electrodes through which contact may be made with the body of the patient, a movable spray-electrode, and a plurality of adjustable conductors within the casing, by which a great variety of connections between the binding-posts and the electrodes may be made by the patient while he is shut in the bath, substantially as described.

5. In an electric vapor-bath, the combination of two batteries furnishing currents of different character, binding-posts within the bath-casing connected with the poles of the batteries, a number of stationary electrodes through which contact may be made with the body of the patient, adjustable electric connections from the binding-posts to the stationary electrodes, a movable spray-electrode, and a movable sponge-electrode, also connected with certain of the binding-posts, by which a great variety of currents may be applied to all parts of the body of the patient in turn without changing the connections of any of the conductors, substantially as described.

6. In an electrical vapor-bath, the combination of an electric battery, binding-posts with double screw-caps within the casing of the bath, which said binding-posts are connected with the poles of the battery, a number of electrodes by which contact with the body of the patient may be made, and a number of bifurcated electrical conductors by which connection between said screw-caps and said electrodes may readily be made in a great variety of ways, substantially as described.

In testimony whereof I affix my signature in the presence of two witnesses.

NATHANIEL LYKE.

Witnesses:
MILTON HUDSON,
DANIEL E. HUGHES.